Feb. 21, 1967  C. C. BUSH  3,304,827
SPRING TYPE TORQUE INDICATING LOCK WASHER
Filed Oct. 13, 1965
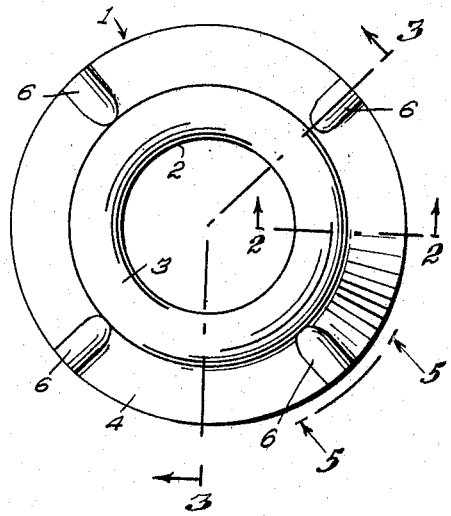
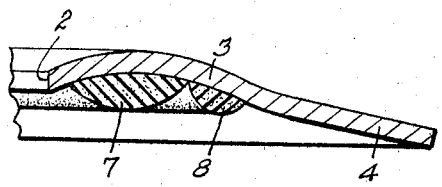
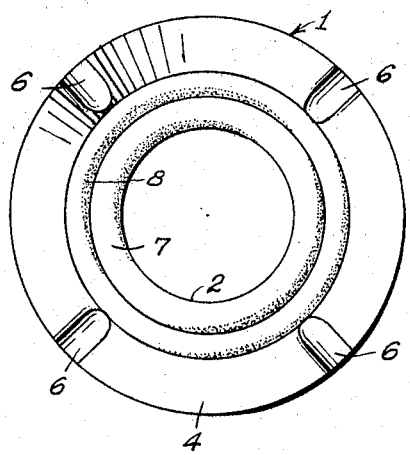
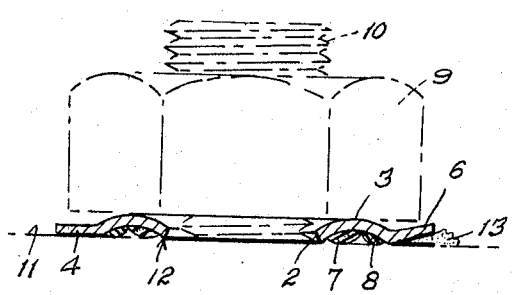
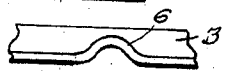
INVENTOR,
Clarence C. Bush
BY: Harry M. Saragovitz,
Edward J. Kelly &
A. J. Dupont
ATTORNEYS.

United States Patent Office 3,304,827
Patented Feb. 21, 1967

3,304,827
SPRING TYPE TORQUE INDICATING LOCK WASHER
Clarence C. Bush, Bel Air, Md., assignor to the United States of America as represented by the Secretary of the Army
Filed Oct. 13, 1965, Ser. No. 495,736
2 Claims. (Cl. 85—62)

The invention described herein may be manufactured and used by or for the Government for governmental purposes, without the payment to me of any royalty thereon.

This invention relates to a spring type torque indicating lock washer and more particularly to a spring steel washer in which are incorporated two annular shaped deposits of indicating material of different colors which, when the washer is compressed, flow outward to indicate sufficient torque or too much torque.

It is a primary object of this invention to provide a lock washer which, upon compression, will indicate the proper torque.

It is another object to coat the underside of a lock washer with a material that will be squeezed outward upon compression of the washer to indicate proper torquing thereof.

A further object is to provide a means of indicating proper torque by applying two annular concentric rings of material of different colors to the underside of a lock washer so that when proper torque has been reached, the material of one color will be squeezed out, and when too much torque has been applied, the material of the other color will be squeezed out.

It is a still further object to provide a torque indicating lock washer that will eliminate the time requirement in the fabrication and assembly of torque indicating means.

It is a final object to provide a torque indication that will be permanent.

These and other objects and advantages of the present invention will be fully apparent from the following description when taken in connection with the annexed drawing, in which:

FIG. 1 is a top plan view of the washer of the invention;
FIG. 2 is a detail section view taken along line 2—2 of FIG. 1 and looking in the direction of the arrows;
FIG. 3 is a section view through the washer and showing it as compressed, and showing in broken lines, a nut and bolt, the section of the washer being taken along line 3—3 of FIG. 1;
FIG. 4 is a bottom view of the washer; and,
FIG. 5 is an edge detail view looking in the direction of the arrows of line 5—5 of FIG. 1.

Referring in detail to the drawing in which like reference numerals designate like parts throughout the several views, reference character 1 indicates generally the washer of the invention which is of the Belleville type and is fabricated from spring steel.

As best seen in FIG. 2, which shows the cross sectional contour of washer 1, the washer is provided with a central opening 2, an annular rounded portion 3 and a downwardly inclining annular skirt portion 4.

The skirt portion 4 is provided with a series of louvers 6 for a purpose to be later described. These louvers extend from the outer perimeter of washer 1 to the rounded portion 3 and are radially disposed, as shown.

Two concentric annular deposits of silicone rubber, or like material, 7 and 8 are carried by the underside of rounded portion 3 (best seen in FIG. 2). The inner deposit 7 may be colored red, while the outer deposit 8, white. Other colors may be used if desired, white and red being suggested by way of example only.

FIG. 3 shows the washer 1 as used with a nut 9 and bolt 10, which are illustrated in broken lines, and the washer 1 is shown as deformed by tightening of the nut 9.

As washer 1 is deformed under compressive loading of nut 9, the inner lip 12 contacts a base structure 11 and acts as a seal to prevent extrusion of the torque indicating material 7 and 8. When sufficient torque has been applied on washer 1 by nut 9, white indicating material 8 will be forced through louver 6 and to the outside as indicated by 13 where it can be observed.

Upon further tightening of nut 9, the washer 1 will be further flattened and red material 7 will be forced also through louver 6 to the outside to be also observed and over torque indicated.

Upon loosening of the nut 9, material 7 will be withdrawn into louver 6 and the torque will be sufficient.

The material will remain permanently, so the condition of the assembly will always be evident.

By observing the color of the material extruded, the proper locking position of washer will readily be observed.

While a nut and bolt assembly has been shown, other uses for washer 1 may be employed such as clamps, etc.

While only a preferred form of the invention has been shown and described, other forms of the invention are contemplated and numerous changes and modifications may be made therein without departing from the spirit of the invention as set forth in the appended claims.

What is claimed is:

1. A spring type torque indicating lock washer including an annular dished body, said body comprising an upwardly rounded, annular portion and an annular skirt depending from the outer periphery of said rounded portion and inclining downwardly from said rounded portion, a series of circumferentially spaced radially directed louvered passageways formed in the underside of said skirt and extending from said rounded portion to the outer circumference of said skirt and first and second concentrically arranged rings of differently colored extrudable indicating material carried by the underside of said rounded portion, said first and second rings of material being extruded in succession through said passageways upon sufficient or over compression of said washer.

2. A lock washer as set forth in claim 1 wherein said first and second rings consist of silicone rubber of different colors.

References Cited by the Examiner
UNITED STATES PATENTS
2,927,495  3/1960  Barwood.
3,086,421  4/1963  Hamman.
3,153,421  10/1964  Canning _____ 85—62

CARL W. TOMLIN, *Primary Examiner.*
RAMON S. BRITTS, *Assistant Examiner.*